United States Patent
Roth et al.

(10) Patent No.: US 6,383,252 B1
(45) Date of Patent: May 7, 2002

(54) METHOD FOR THE HEAT TREATMENT OF RESIDUES CONTAINING HEAVY METALS

(75) Inventors: Jean-Luc Roth, Thionville (FR); Thomas Hansmann, Trier (DE); Romain Frieden, Beidweiler; Marc Solvi, Ehlange s/ Mess, both of (LU)

(73) Assignee: Paul Wurth S.A., Luxemburg (LU)

( * ) Notice: Subject to any disclaimer, the term of this patent is extended or adjusted under 35 U.S.C. 154(b) by 0 days.

(21) Appl. No.: 09/807,998

(22) PCT Filed: Nov. 4, 1999

(86) PCT No.: PCT/EP99/08439

§ 371 Date: May 4, 2001

§ 102(e) Date: May 4, 2001

(87) PCT Pub. No.: WO00/28094

PCT Pub. Date: May 18, 2000

(30) Foreign Application Priority Data

Nov. 5, 1998 (LU) .............................................. 90315

(51) Int. Cl.[7] .............................................. C21B 13/08
(52) U.S. Cl. .............................. 75/414; 75/483; 75/658; 75/64
(58) Field of Search .......................... 75/483, 658, 694, 75/414

(56) References Cited

U.S. PATENT DOCUMENTS 2,089,782 A    8/1937  Carlsson
2,792,298 A    5/1957  Freeman
3,617,256 A  * 11/1971 Joseph et al. .................. 75/483
3,756,804 A    9/1973  Stevenson
3,850,613 A   11/1974  Allen

FOREIGN PATENT DOCUMENTS

| DE | 1 225 673 | 9/1966 |
| EP | 0 046 146 | 2/1982 |
| EP | 0 150 805 | 8/1985 |
| GB | 2 140 141 | 11/1984 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

The invention relates to a method for the heat treatment of residues containing heavy metals, carried out in a multiple-hearth furnace which is divided into three zones, each of which comprises several stacked levels. Said method consists of the following steps: continuous feeding of the heavy-metal residues into the top level of the first zone of the multiple-hearth furnace, the residues being gradually transferred to the second zone and dried during the transfer; continuous feeding of reducing agents and desulfurizers into the top level of the second zone, whereby the reducing agents and desulfirizers are mixed with the dried residues and the mixture is heated to approximately 800° C., calcined during heating and gradually transferred to the third zone; heating of the mixture to approximately 1000° C. in the third zone, whereby the metals are reduced and the waste gases resulting in said third zone are drawn off and treated separately; and discharge of the mixture from the multiple-hearth furnace.

18 Claims, 1 Drawing Sheet

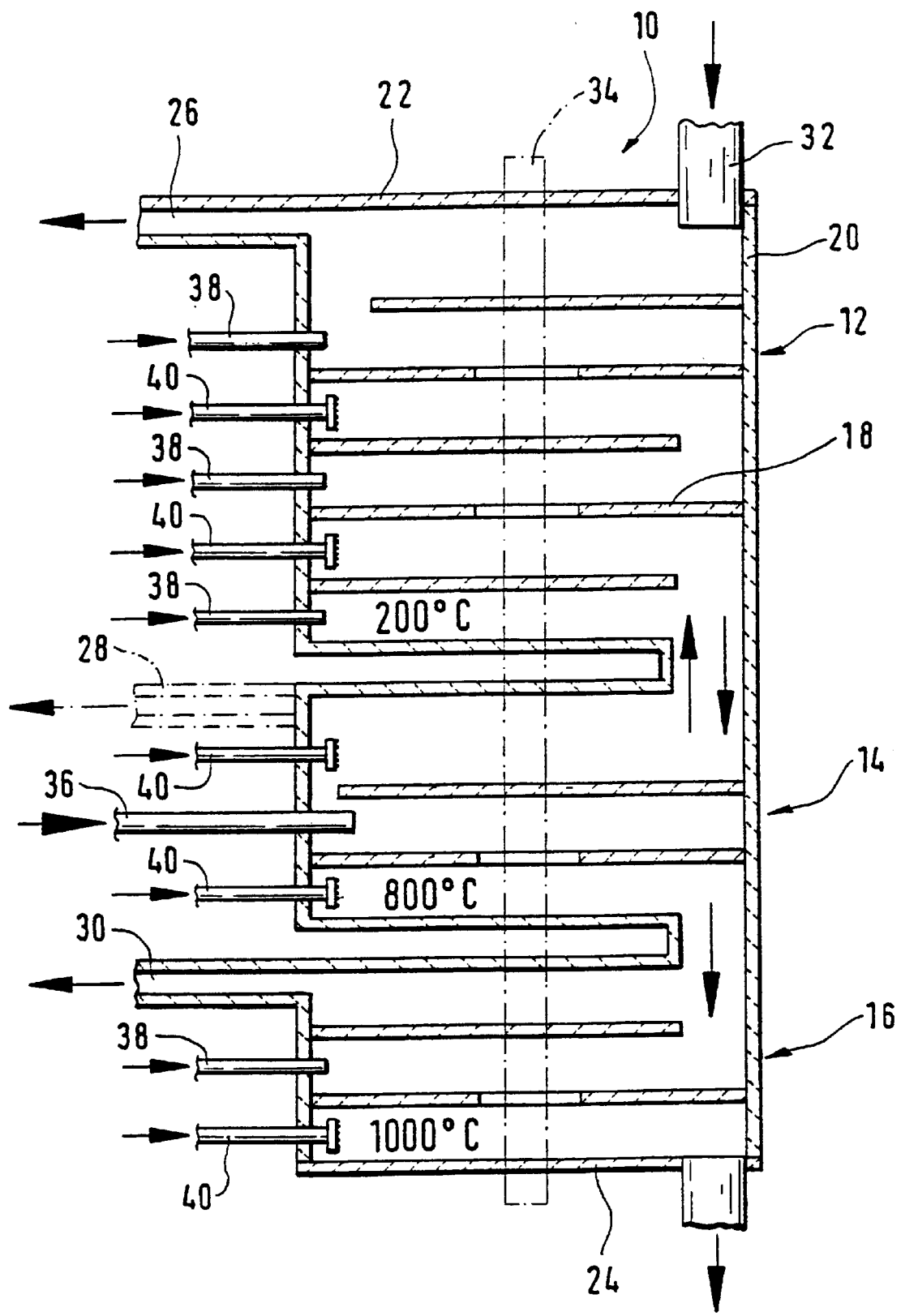

METHOD FOR THE HEAT TREATMENT OF RESIDUES CONTAINING HEAVY METALS

The invention relates to a process for thermal treatment of residual materials containing heavy metals, e.g. sludges from surface treatment, pickling and cleaning, metallisation and tin-coating processes on metal parts.

These processes produce large quantities of residual materials containing heavy metals in the form of sludge. These residual materials occur, for example, during filtration of the immersion baths and contain various metals such as zinc, nickel, molybdenum, cobalt, copper and iron in the form of hydroxides, chlorides and sulphates in addition to large quantities of water. The disposal of these residual materials is expensive and their final storage problematical. The sludges are generally stored in special dumps.

Typical compositions of such sludges containing heavy metals are shown in the following table.

TABLE 1

| | Ni, Cu, Fe, Mo, Ko (%) | Zn (%) | S (%) | Cl (%) | CaO (%) | Inert substances (%) | $H_2O$ (%) |
|---|---|---|---|---|---|---|---|
| Sludges | 15–50 | >30 | 1–15 | >5 | 10–30 | 1–5 | 10–75 |

Consequently, the task of the invention is to propose a process for thermal treatment of such residual materials containing heavy metals.

According to the invention this problem is solved by a process for thermal treatment of residual materials containing heavy metals in a multiple-hearth furnace, which is divided into three zones, each zone having several hearths one above the other, and the process comprising the following steps:

- continuous introduction of the residual materials containing heavy metals to the top hearth of the first zone of the multiple-hearth furnace, the residual materials being transferred gradually into the second zone and dried;
- continuous introduction of reducing agents and desulphurising agents to the top hearth of the second zone, the reducing agents and desulphurising agents being mixed with the dried residual materials, the mixture being heated to about 800° C. and calcined and gradually transferred into the third zone;
- heating of the mixture to about 1000° C. in the third zone, the metals being reduced and the waste gases produced in this third zone being exhausted and treated separately;
- discharge of the mixture from the multiple-hearth furnace.

An important advantage of the invention is that the metallic oxides, sulphates chlorides, etc. present as a mixture can be reduced and separated (in particular iron and zinc), so that the separated fractions constitute feed materials for other processes. By-products can thus be manufactured from important constituents of the residual materials. After passing through the process, the iron proportion can be returned to production in a steel works. Heavy metal oxides are concentrated to such an extent that they can be used as raw material for recovery of heavy metals. Ashes consisting essentially of inert substances such as $SiO_2$, $Al_2O_3$, MgO, . . . and an excess of reducing agents remain.

In the first zone the residual materials containing heavy metals are heated indirectly by heating resistors or directly by burners to approximately 200° C., so that the water is fully evaporated, and subsequently transferred into the second zone. In this zone reducing agents and desulphurising agents are mixed with the residual materials containing heavy metals, and this mixture is heated to about 800° C., the mixture being calcined. The carbonates and sulphates present in the mixture are decomposed and converted to metallic oxides, carbon dioxide and sulphur dioxide being released. The sulphur dioxide reacts with the desulphurising agents, so that the sulphur content in the gases inside the multiple-hearth furnace remains low. After the mixture has reached a temperature of about 800° C. the calcination is completed and the mixture is fed into the third zone and heated further. As soon as it reaches a certain temperature (above about 900° C.) the metallic oxides begin to react with the reducing agents, the heavy metals evaporating and being discharged with the waste gases from the multiple-hearth furnace.

The heavy metals are exhausted from the hearths in the third zone, where they are formed, and treated separately from the other waste gases. These waste gases are subsequently oxidised, e.g. in an after-combustion chamber, the heavy metals being converted to heavy metal oxides, which can then be separated from the waste gases in filter equipment.

At the same time or later the iron oxides remaining in the multiple-hearth furnace are reduced to metallic iron. The metallic iron produced in this way is discharged from the furnace together with the residues of the material introduced, the ashes of the reducing agents and any excess reducing agents.

In this process sludge-type residual materials containing heavy metals can be charged, agglomeration of the particles being prevented by selective process control and continuous circulation. Regardless of the consistency of the feed material the process supplies a fine-grained end product. This is particularly advantageous if ash-forming reducing agents are used. As the solid end product is fine-grained, the ash can easily be separated from the iron. This separation can take place, for example, in the hot condition by screening.

After cooling below 700° C. it is possible on the other hand to separate the reduced iron via magnetic separators from the ash and excess reducing agent.

The quality of the directly reduced iron obtained in this way is virtually independent of the quantity of reducing agent residues. The iron obtained can subsequently be processed into briquettes or introduced directly into a melting furnace (electric furnace etc.) and further processed.

The residues produced can be utilised with any unused reducing agents present therein in a separate gasification reactor, the ash-forming constituents advantageously being separated as liquid slag and the crude gas formed used as combustion or reduction gas in the multiple-hearth furnace.

Accordingly it is possible to use an inexpensive reducing agent which has a relatively high ash content, and/or work with a relatively high excess of reducing agents, which prevents agglomeration of the residual materials.

When working with excess reducing agents it is possible to prepare the residues to separate the unused reducing agents and reuse them. This can be done, for example, by screening the residues, if the unused reducing agents are present in an adequately coarse form. The unused reducing agents can be returned directly to the multiple-hearth furnace.

However, the charging of reducing agents can also be distributed over several stages.

It is thus possible to feed coarse-grained reducing agents (1–3 mm) at a higher point in the second zone of the multiple-hearth furnace and fine-grained reducing agents (<1 mm) at a lower point. Consequently discharge of dust with the waste gases is largely avoided and the course of the reaction is accelerated by the fine reducing agent particles fed in further below.

The charging of coarser particles reduces the consumption of reducing agents, because in the upper hearths, on which an oxidising atmosphere prevails, the small particles are quickly consumed by reaction with $H_2O$ and $CO_2$ from the waste gas.

The process space is subdivided into various zones, the solids move continuously from the top downwards and the gases are conducted from below upwards through the furnace. The process conditions in the various zones or even on each hearth can be measured and selectively controlled by the subdivision of the process space into various zones.

The residual materials containing heavy metals can, however, also be mixed with at least part of the required reducing agents or desulphurising agents before they are introduced into the multiple-hearth furnace. This applies in particular in the case of treatment of sludges with a high water content, which are mixed with at least part of the required reducing agents or desulphurising agents before they are fed into the furnace. The sludges generally have a tacky consistency and can be introduced more easily into the furnace if they are mixed with reducing agents or desulphurising agents. The mixing with the reducing agents or desulphurising agents prevents the charged material from forming agglomerates during heating.

The residual materials containing heavy metals are circulated continuously by rakes installed on each hearth of the furnace and conveyed gradually to the underlying hearth.

Agglomeration of the particles is prevented by the continuous circulation. The rate of circulation depends on many factors such as the geometry of the rakes, the thickness of the layers, etc. The residual materials containing heavy metals, any reducing agents and desulphurising agents on the hearths should be turned over at least once every 1–3 minutes, with the result that agglomeration is largely avoided.

It is possible to inject gases containing oxygen selectively on the hearth, where the heat requirement must be covered by combustion of the excess process gases.

It is advantageous to use gases containing oxygen which have a temperature of at least 250° C.

A gaseous reducing agent can additionally be injected on the bottom hearths of the third zone of the multiple-hearth furnace. Consequently a higher reduction potential of the atmosphere in the furnace is realised and more complete reduction of the oxides achieved.

According to a further advantageous embodiment one or more hearths in the furnace which are below the hearth to which reducing agents are introduced are heated by burners.

To prevent any reduction of the concentration of reducing gases in the lowest part of the furnace by flue gases from the heating system, energy can also be supplied indirectly in this case, i.e. by radiation heating.

According to another preferred embodiment gases are exhausted from the multiple-hearth furnace at one or more hearths in each zone. These hot gases can subsequently be conducted either through a $CO_2$ scrubber to reduce the gas quantity and increase the reduction potential of the gas or through an additional reactor in which carbon is present, so that the carbon dioxide in the hot gases reacts with the carbon to form carbon monoxide according to the Boudouard equilibrium and the reduction potential of the gas is thus increased. The gases enriched with carbon monoxide are subsequently returned to the multiple-hearth furnace.

Some of the gases, which flow upwards in the furnace, can also be exhausted from the furnace through a connection piece in the side wall below the hearths on which heavy metals evaporate, and re-injected into the furnace above these hearths through an inlet. Consequently the gas quantity present on the hearths on which the heavy metal oxides are reduced to heavy metals and evaporate is small. The heavy metals can then be exhausted in a relatively small gas quantity on these hearths from the furnace through an outlet in the side wall. The gas mixture removed is burnt, cooled in cooling equipment and subsequently cleaned with the aid of a filter before it is discharged into the atmosphere.

As a result of the small waste gas quantities the gas flow rates on the corresponding hearths are low, hence only small quantities of dust are discharged with this waste gas. Consequently an extremely high heavy metal concentration is present in the waste gas.

The multiple-hearth furnace can be operated under a specific overpressure for a further increase in productivity. In contrast to a rotary furnace, which is sealed by water seals with a diameter of about 50 m, this can be realised very easily in a multiple-hearth furnace, which has only small seals on the drive shaft. In such a case pressure locks must be provided for the feed and removal of material.

According to another aspect of the invention the use of a multiple-hearth furnace for thermal treatment of residual materials containing heavy metals according to the described process is proposed.

Further advantageous embodiments are listed in the subclaims.

An embodiment of the invention is described below with the aid of the enclosed figure.

FIG. 1 is a section through a multiple-hearth furnace for thermal treatment of residual materials containing heavy metals.

FIG. 1 shows a section through a multiple-hearth furnace 10, which consists of three zones 12, 14, 16 one below the other, each of which has several hearths 18. These unsupported hearths 18 as well as the shell 20, the cover 22 and the bottom 24 of the furnace are made from refractory material.

An exhaust connection piece 26, 28, 30, through which the gases can be evacuated from the furnace 10, is provided in each zone 12, 14, 16. The waste gases of the three zones 12, 14, 16 have a different composition, so that it is logical to treat the waste gases of the different zones 12, 14, 16 separately.

An opening 32, through which the residual materials containing heavy metals can be charged to the top hearth in the first zone, is provided in the cover 22.

A shaft 34, on which rakes projecting over the respective hearths are mounted, is installed in the centre of the furnace.

The rakes are designed in such a way that they circulate the material on a hearth from the inside outwards and then on the underlying hearth from the outside inwards in order to transport the material from the top downwards through the furnace. The shaft 34 and rakes are air-cooled and openings, through which the air can flow into the interior of the furnace and be used there for after-combustion, are provided on the rakes.

The residual materials are charged to the first hearth in the first zone 12, whereas the reducing agents and desulphurising agents are charged into the second zone 14, where they are brought into contact with the residual materials containing heavy metals.

During transport through the first zone 12 the residual materials containing heavy metals are heated to about 200° C. and dried.

At least one inlet opening 36, through which the reducing agents and desulphurising agents can be introduced into the furnace, is provided in the shell 20 of the multiple-hearth furnace 10—normally in the upper third of the second zone 14. These reducing agents may be present in gaseous as well as in liquid or solid form. The reducing agents are carbon monoxide, hydrogen, natural gas, petroleum and petroleum derivatives or solid carbon carriers such as lignite coke, petroleum coke, blast furnace dust, coal or the like. The desulphurising agents contain, for example, lime (CaO), limestone ($CaCO_3$) and/or magnesite (MgO).

The reducing agents and the desulphurising agents introduced into the second zone 14 are mixed there with the heated residual materials containing heavy metals by the rakes and heated to about 800° C.

In the third zone 16 the mixture of residual materials containing heavy metals, reducing agents and desulphurising agents is heated to about 1000° C. The oxides present in the residual materials are gradually reduced to metal by the high temperature and the presence of carbon monoxide during transport through the multiple-hearth furnace 10.

Reduction of the residual materials containing heavy metals can be accurately controlled and the process carried out under optimum conditions by the controlled feed of solid, liquid and gaseous reducing agents and gases containing oxygen at various points of the multiple-hearth furnace 10 and by the possibility of exhausting gases at critical points.

Nozzles 38 for injection of hot (350° C. to 500° C.) gases containing oxygen, through which air or another gas containing oxygen can be fed into the multiple-hearth furnace 10, are provided in the side wall. As a result of the high temperatures and the presence of oxygen some of the carbon burns to carbon dioxide, which in turn reacts with the carbon present in excess and is converted to carbon monoxide. The carbon monoxide finally reduces the oxides.

As this reaction is predominantly endothermal, it is logical to install burners 40, which ensure a uniformly high temperature in the furnace hearths. Gas or pulverised coal burners can be used.

These burners 40 can be fired with gas or pulverised coal with air for preheating and/or additional heating. An additional reduction gas can be produced by the quantitative ratio between oxygen and fuel or, in the case of excess air, post-combustion of the process gases is achieved. In the case of pulverised coal firing an excess of carbon monoxide can be produced in the burner. With external combustion chambers the ash of the burnt coal can be prevented from entering the furnace and mixing with the iron. The temperatures in the combustion chambers are selected in such a way that the slag produced can be tapped in liquid form and disposed of in vitrified form. The consumption of solid carbon carriers in the furnace 10 and thus also the ash content of the end product are reduced by the production of carbon monoxide.

In the last or last two hearths provision is made for feed of a gaseous reducing agent, e.g. carbon monoxide or hydrogen, through special nozzles. In this atmosphere with increased reduction potential the reduction of the metallic oxides can be completed.

What is claimed is:

1. Process for thermal treatment of residual materials containing heavy metals and water in a multiple-hearth furnace, which is divided into three zones, each zone having several hearths one above the other, and the process comprising the follow steps:
   continuous introduction of the residual materials containing heavy metals and water on the top hearth of the first zone of the multiple-hearth furnace, the residual materials being transferred gradually into the second zone and dried, to remove the water, at the same time;
   continuous introduction of reducing agents and desulphurising agents to the top hearth of the second zone, the reducing agents and desulphurising agents being mixed with the dried residual materials, the mixture being heated and calcined and gradually transferred into the third zone;
   heating of the mixture in the third zone, the metals being reduced and the waste gases produced in this third zone being exhausted and treated separately; and
   discharge of the mixture from the multiple-hearth furnace.

2. Process according to claim 1, wherein the desulphurising agents contain lime, limestone and/or magnesite.

3. Process according to claim 1, wherein the reducing agent is introduced in liquid, solid and/or gaseous form into the multiple-hearth furnace.

4. Process according to claim 1, wherein an excess of reducing agent is introduced into the multiple-hearth furnace.

5. Process according to claim 1, wherein the residual materials containing heavy metals and at least part of the required reducing agent are mixed with each other before they are introduced into the multiple-hearth furnace.

6. Process according to claim 1, wherein the waste gases from the third zone are processed in an after-burner, the volatile metals contained therein being converted to metallic oxides and separated from the waste gases in filter equipment.

7. Process according to claim 1, wherein
   the residual materials further contain iron; and
   after discharge from the multiple-hearth furnace at least a portion of the iron is separated from the mixture.

8. Process according to claim 1, wherein after discharge from the multiple-hearth furnace unused reducing agents are separated from the mixture.

9. Process according to claim 1 wherein one or more furnace hearths are heated directly or indirectly.

10. Process according to claim 1, wherein gases containing oxygen are injected selectively to different hearths.

11. Process according to claim 10, wherein the gases containing oxygen have a temperature of at least 250° C.

12. Process according to claim 1, wherein gaseous reducing agents are injected into the bottom hearths in the third zone of the multiple-hearth furnace.

13. Process according to claim 1, wherein gases are exhausted from the multiple-hearth furnace on a hearth in each zone.

14. Process according to claim 1, wherein the process takes place under overpressure.

15. Process according to claim 1, wherein the mixture in the second zone is heated to about 800° C.

16. Process according to claim 1, wherein the mixture in the third zone is heated to about 1000° C.

17. Process according to claim 1, wherein the residual materials containing heavy metals and water comprise 10 to 75% water.

18. Process for thermal treatment of sludge containing heavy metals in a multiple-hearth furnace, which is divided into three zones, each zone having several hearths one above the other, and the process comprising the follow steps:

continuous introduction of the sludge containing heavy metals on the top hearth of the first zone of the multiple-hearth furnace, the sludge being transferred gradually into the second zone and dried at the same time;

continuous introduction of reducing agents and desulphurising agents to the top hearth of the second zone, the reducing agents and desulphurising agents being mixed with the dried sludge, the mixture being heated and calcined and gradually transferred into the third zone;

heating of the mixture in the third zone, the metals being reduced and the waste gases produced in this third zone being exhausted and treated separately; and discharge of the mixture from the multiple-hearth furnace.

* * * * *